United States Patent
Ryu et al.

(10) Patent No.: US 11,584,220 B2
(45) Date of Patent: Feb. 21, 2023

(54) FUEL TANK ISOLATION VALVE FOR VEHICLE

(71) Applicants: Hyundai Motor Company, Seoul (KR); Kia Corporation, Seoul (KR)

(72) Inventors: Bu Yeol Ryu, Gyeonggi-do (KR); Hyun Do Jeon, Seoul (KR); Tac Koon Kim, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/689,488

(22) Filed: Mar. 8, 2022

(65) Prior Publication Data

US 2022/0305906 A1    Sep. 29, 2022

(30) Foreign Application Priority Data

Mar. 26, 2021  (KR) .................. 10-2021-0039441

(51) Int. Cl.
*B60K 15/035* (2006.01)
*B60K 15/03* (2006.01)
*F02M 25/08* (2006.01)

(52) U.S. Cl.
CPC .. *B60K 15/03504* (2013.01); *B60K 15/03006* (2013.01); *B60K 15/03519* (2013.01); *F02M 25/0836* (2013.01); *F02M 25/0854* (2013.01); *B60K 2015/03026* (2013.01); *B60K 2015/03296* (2013.01); *B60K 2015/03302* (2013.01); *B60K 2015/03514* (2013.01)

(58) Field of Classification Search
CPC ............... F02M 25/08; F02M 25/0836; F02M 25/0854; F02M 25/089; F02M 2025/0845; B60K 15/03006; B60K 15/03504; B60K 15/03519; B60K 2015/03026; B60K 2015/03296; B60K 2015/03302; B60K 2015/03514; F16K 31/0655

See application file for complete search history.

(56) References Cited

U.S. PATENT DOCUMENTS

| | | | | |
|---|---|---|---|---|
| 3,173,646 A | * | 3/1965 | Wilcox | ............... F16K 31/0627 251/129.2 |
| 4,221,238 A | * | 9/1980 | Madsen | ................ F16K 31/528 137/627.5 |
| 5,573,224 A | * | 11/1996 | Kim | .................. F16K 31/52408 251/30.04 |
| 5,599,003 A | * | 2/1997 | Seemann | .......... F16K 31/52408 251/38 |
| 9,500,291 B2 | | 11/2016 | Pifer et al. | |
| 9,631,583 B2 | | 4/2017 | Balsdon et al. | |
| 9,890,747 B2 | | 2/2018 | Williams et al. | |

(Continued)

FOREIGN PATENT DOCUMENTS

| CN | 112267958 A | * | 1/2021 | ........... B60K 15/035 |
|---|---|---|---|---|
| JP | 2017-057724 A | | 3/2017 | |

(Continued)

*Primary Examiner* — John M Zaleskas

(74) *Attorney, Agent, or Firm* — Fox Rothschild LLP

(57) ABSTRACT

A fuel tank isolation valve for a vehicle is provided. A valve opening operation or a valve closing operation is performed using guide protrusions configured to move along a guide slot, in response to an upward or downward movement of a plunger. The discharge of a battery is prevented. An abrupt change in the pressure of a fuel tank is prevented.

12 Claims, 21 Drawing Sheets

(56) References Cited

U.S. PATENT DOCUMENTS

| | | | |
|---|---|---|---|
| 10,717,353 B2 | 7/2020 | Vulkan et al. | |
| 2001/0017160 A1* | 8/2001 | Ishigaki | F16K 31/082 137/519 |
| 2002/0026960 A1* | 3/2002 | Weldon | F16K 31/0651 137/601.14 |
| 2002/0088440 A1* | 7/2002 | Weldon | F16K 31/0675 123/519 |
| 2002/0185181 A1* | 12/2002 | Weldon | F16K 3/265 137/630.19 |
| 2003/0042452 A1* | 3/2003 | Burke | F16K 31/06 251/129.15 |
| 2005/0217734 A1* | 10/2005 | Takakura | F16K 31/0655 137/587 |
| 2006/0185735 A1* | 8/2006 | Tsuge | F02M 25/0836 137/495 |
| 2006/0207663 A1* | 9/2006 | Tsuge | F16K 31/0693 137/495 |
| 2009/0242815 A1* | 10/2009 | Chen | F16K 31/52408 251/129.21 |
| 2009/0256093 A1* | 10/2009 | Chen | F16K 31/0675 251/129.15 |
| 2010/0269921 A1* | 10/2010 | Pifer | G05D 7/0676 137/511 |
| 2011/0162728 A1* | 7/2011 | Pifer | F16K 17/0413 137/487.5 |
| 2011/0168931 A1* | 7/2011 | Sugiura | F16K 31/04 251/129.15 |
| 2011/0240145 A1* | 10/2011 | Pifer | F16K 31/0655 137/487.5 |
| 2012/0024265 A1* | 2/2012 | Keller | F16K 31/0655 251/129.17 |
| 2012/0055943 A1* | 3/2012 | Muller-Riederer | F16K 24/04 220/745 |
| 2012/0073548 A1* | 3/2012 | Lee | B60K 15/03519 123/520 |
| 2012/0138610 A1* | 6/2012 | Lee | B60K 15/03519 220/89.1 |
| 2012/0255639 A1* | 10/2012 | Onodera | F02M 25/089 137/637 |
| 2013/0048890 A1* | 2/2013 | Miura | F16K 17/196 251/129.01 |
| 2013/0112290 A1* | 5/2013 | Gerlich | F16K 24/04 137/487.5 |
| 2013/0134339 A1* | 5/2013 | Miura | F16K 31/0655 251/337 |
| 2014/0020663 A1* | 1/2014 | Pifer | F16K 31/0655 137/115.06 |
| 2014/0041737 A1* | 2/2014 | Pifer | F16K 31/02 137/487.5 |
| 2014/0264113 A1* | 9/2014 | Grover | F16K 31/003 251/129.15 |
| 2015/0027571 A1* | 1/2015 | Kishi | F16K 27/029 137/614.2 |
| 2015/0059711 A1* | 3/2015 | Kishi | F02M 25/0836 137/535 |
| 2015/0096633 A1* | 4/2015 | Pifer | F16K 24/04 137/599.11 |
| 2015/0101577 A1* | 4/2015 | Balsdon | F02M 25/089 123/519 |
| 2015/0101677 A1* | 4/2015 | Balsdon | F02M 25/0836 137/197 |
| 2015/0101689 A1* | 4/2015 | Balsdon | F02M 25/0818 137/551 |
| 2015/0102039 A1* | 4/2015 | Balsdon | F02M 25/089 251/129.11 |
| 2015/0144819 A1* | 5/2015 | Pifer | F16K 24/04 251/129.15 |
| 2015/0330514 A1* | 11/2015 | Harada | B60K 15/03519 137/484.2 |
| 2016/0025238 A1* | 1/2016 | Miura | B60K 15/03504 137/535 |
| 2016/0090945 A1* | 3/2016 | Onodera | F16K 1/526 137/516.13 |
| 2016/0123490 A1* | 5/2016 | McLauchlan | F16K 31/0655 137/15.18 |
| 2016/0237956 A1* | 8/2016 | Uchida | B60K 15/03504 |
| 2016/0298579 A1* | 10/2016 | Peters | F02M 25/08 |
| 2016/0298778 A1* | 10/2016 | Young | B60K 15/03504 |
| 2016/0311315 A1* | 10/2016 | Young | B60K 15/03519 |
| 2016/0370812 A1* | 12/2016 | Harada | G05D 16/2086 |
| 2017/0036531 A1 | 2/2017 | McLauchlan et al. | |
| 2017/0050512 A1* | 2/2017 | Ognjanovski, Jr. | F02M 25/08 |
| 2017/0072788 A1* | 3/2017 | Ogiwara | B60K 15/03519 |
| 2017/0107953 A1* | 4/2017 | Weldon | F02M 26/53 |
| 2017/0191580 A1* | 7/2017 | Pifer | F16K 31/0696 |
| 2018/0266583 A1* | 9/2018 | Peterson | F16K 31/52416 |
| 2019/0210582 A1* | 7/2019 | Stahr | F16K 31/003 |
| 2021/0254583 A1* | 8/2021 | Brock | F02M 25/0854 |
| 2022/0034419 A1* | 2/2022 | Kim | B60K 15/03519 |
| 2022/0042481 A1* | 2/2022 | Ryu | F16K 31/0655 |

FOREIGN PATENT DOCUMENTS

| | | | | |
|---|---|---|---|---|
| JP | 2018-009676 A | | 1/2018 | |
| KR | 101047302 B1 | * | 7/2011 | |
| KR | 101076231 B1 | | 10/2011 | |
| KR | 101181065 B1 | | 9/2012 | |
| KR | 101197453 B1 | | 11/2012 | |
| KR | 20130113427 A | * | 10/2013 | B60K 15/035 |

* cited by examiner

FUEL TANK ISOLATION VALVE FOR VEHICLE

CROSS REFERENCE TO RELATED APPLICATION

The present application claims priority to Korean Patent Application No. 10-2021-0039441, filed Mar. 26, 2021, the entire contents of which are incorporated herein for all purposes by this reference.

BACKGROUND

Field of the Disclosure

The present disclosure relates generally to a fuel tank isolation valve for a vehicle and, more particularly, to a fuel tank isolation valve for a vehicle, in which a valve opening operation or a valve closing operation may be performed using guide protrusions configured to move along a guide slot, in response to an upward or downward movement of a plunger, thereby preventing the discharge of a battery and preventing an abrupt change in the pressure of a fuel tank.

Description of the Related Art

Referring to FIG. 1, a canister 20 collecting fuel evaporation gas and purging the collected fuel evaporation gas to be combustible in a combustion chamber of an engine 30 is connected to a fuel tank 10 of a vehicle according to the prior art. In this regard, an inlet 21 of the canister 20 is connected to the fuel tank 10 through a discharge line 13, and an outlet 22 of the canister 20 is connected to an engine intake duct 31 through a purge line 14.

In addition, a collector (not shown) for collecting evaporation gas by adsorption is disposed inside the canister 20, and a discharge port 23 for discharging purified air, from which the evaporation gas is collected by the collector, is provided on the canister 20. Thus, in response to the operation of a fuel pump 11 mounted inside the fuel tank 10, fuel is supplied to an engine 30 along a fuel supply line 12 such that the fuel is combustible. In addition, after evaporation gas evaporated from fuel within the fuel tank 10 is collected in the canister 20 through the discharge line 13, the evaporation gas may be supplied to the engine 30 along the purge line 14 by negative intake pressure of the engine such that the evaporation gas is combustible.

However, in a hybrid vehicle, in particular, a plug-in hybrid electric vehicle (PHEV) that mainly drives in an electric vehicle (EV) drive mode by operating a drive motor, there is the following limitation. When the canister 20 has collected a maximum amount of evaporation gas, any further amount of evaporation gas continuously entering from the fuel tank 10 may not be collected. When the hybrid vehicle is changed to a hybrid electric vehicle (HEV) drive mode in which the engine operates, evaporation gas collected in the canister 20 is purged to be combustible in the engine. However, during parking or stopping of the vehicle and in the EV drive mode, evaporation gas exceeding the capacity of collection of the canister 20 continuously enters from the fuel tank 10.

Thus, when evaporation gas continuously enters the canister 20 from the fuel tank 10 in a situation in which a maximum amount of evaporation gas has been collected in the canister 20, evaporation gas exceeding the capacity of collection of the canister 20 is not collected but discharged to the air through the discharge port 23, thereby causing air pollution, which is problematic. To overcome such problems, an isolation valve 200 is mounted on the discharge line 13, as illustrated in FIG. 2 according to the prior art. The isolation valve 200 is configured to be opened or closed to allow or block evaporation gas to flow from the fuel tank 10 to the canister 20.

The isolation valve 200 is a solenoid valve that operates to be opened when power is applied thereto. The isolation valve 200 is normally closed and operates to be opened only when the engine is operated or fuel is supplied to the fuel tank. More specifically, the isolation valve 200 remains closed in normal conditions in which the engine does not operate, such as during parking or stopping or in the EV drive mode. When the engine operates, the isolation valve 200 may operate to be opened using power applied thereto in response to a signal from a controller (e.g. an engine control unit (ECU)). During the supply of fuel, the isolation valve 200 may operate to be opened using power applied thereto in response to a signal from a controller (e.g. a body control module (BCM)).

Thus, when the isolation valve 200 remains closed, evaporation gas within the fuel tank 10 may be isolated and stored within the fuel tank 10 instead of flowing to the canister 20. Consequently, evaporation gas may be prevented from being discharged to the air through the canister 20. In contrast, when the isolation valve 200 operates to be opened during the operation of the engine, evaporation gas within the fuel tank 10 is collected in the canister 20 by passing through the opened isolation valve 200. The collected evaporation gas may be purged to be combustible in the engine by negative intake pressure of the engine.

Alternatively, when the isolation valve 200 operates to be opened during the supply of fuel to the fuel tank, at the same time that evaporation gas within the fuel tank 10 is collected in the canister 20 by passing through the opened isolation valve 200, internal pressure in the fuel tank 10 may be removed, thereby facilitating the supply of fuel to the fuel tank 10. At this time, when a user presses the button of fuel door in the cabin of the vehicle, the controller (e.g. the BCM) determines that the isolation valve 200 operates to be opened to remove the internal pressure in the fuel tank 10 and then operates an electric fuel tank cap 40 to be opened.

Hereinafter, a configuration and a flow of operations of a related-art isolation valve will be described with reference to FIGS. 3 to 5 according to the prior art. Referring to the exterior of the isolation valve 200, an upper housing 210 and a lower housing 230 are coupled to each other. A first path 231 communicating with a fuel tank and a second path 232 communicating with a canister are provided inside the lower housing 230. An opening/closing path 233 configured to be opened and closed by a valve body 217 is provided at the boundary between the first path 231 and the second path 232.

A hollow bobbin 212 with a coil 211 wound thereon is mounted on the inner wall of the upper housing 210, and a core 213 is disposed inside the bobbin 212. In addition, the core 213 has a plunger lift path 214 with the bottom portion thereof being open, and a plunger 215 is disposed within the plunger lift path 214 to be movable vertically. Furthermore, a valve lift path 216 with the bottom portion thereof being open is provided in the plunger 215. The valve body 217 configured to open and close the opening/closing path 233 is disposed within the valve lift path 216 to be movable vertically.

In addition, an evaporation gas path 218 extends through the valve body 217 in the top-bottom direction, allowing evaporation gas to pass therethrough. In particular, a first spring 219 is connected to the bottom surface of the core 213 and the bottom end of the plunger 215, and a second spring 220 is connected to the bottom surface of the valve body 217 and the opening/closing path 233.

Closing Operation of Isolation Valve

Referring to FIG. 3, when power is not applied to the coil 211, at the same time that the plunger 215 is moved downward by elastic restorative force of the first spring 219 in the tensioning direction, the plunger 215 presses the valve body 217 downward. Consequently, the valve body 217 closes the opening/closing path 233 while compressing the second spring 220, to block the evaporation gas within the fuel tank from flowing to the canister. In this manner, the closing of the isolation valve 200 is performed.

Then, in a situation in which the engine does not operate, such as in during parking or stopping or in the EV drive mode, the isolation valve 200 remains closed. Thus, evaporation gas within the fuel tank 10 may be isolated and stored in the fuel tank 10 instead of flowing to the canister 20, thereby being prevented from being discharged to the air through the canister 20.

Opening Operation of Isolation Valve

Referring to FIG. 4, when power is applied to the coil 211, the plunger 215 is instantaneously moved upward along the plunger lift path 214 of the core 213 by magnetic attractive force. Thus, primarily, a path is defined by a gap between the plunger 215 and the valve body 217.

Thus, evaporation gas within the fuel tank sequentially flows through the first path 231 of the lower housing 230, the gap path between the plunger 215 and the valve body 217, the evaporation gas path 218 of the valve body 217, and the second path 232 of the lower housing 230, thereby flowing to the canister connected to the second path 232 to thus collect evaporation gas. Subsequently, as illustrated in FIG. 5, the valve body 217 is moved upward along the valve lift path 216 of the plunger 215 by elastic restorative force of the second spring 220 in the tensioning direction, thereby opening the opening/closing path 233. Consequently, evaporation gas within the fuel tank sequentially flows through the first path 231 of the lower housing 230, the opening/closing path 233, and the second path 232, thereby flowing to the canister to collect evaporation gas.

Thus, when the engine of the hybrid vehicle operates, evaporation gas within the fuel tank 10 may pass through the opened isolation valve 200 to be collected in the canister 20. The collected evaporation gas may be purged by negative intake pressure of the engine to be combustible in the engine. In addition, during the supply of fuel to the fuel tank, at the same time that evaporation gas within the fuel tank 10 is collected in the canister 20 by passing through the opened isolation valve 200, internal pressure in the fuel tank 10 may be removed, thereby facilitating the supply of fuel to the fuel tank.

However, the above-described isolation valve of the related art has the following problems.

First, when the isolation valve operates to be opened in response to power being applied to the coil, current is continuously supplied to the coil to maintain the opened position, thereby discharging the battery.

Second, as the current is continuously supplied to the coil, a malfunction or a fire may be caused by heat.

Third, in a situation in which there is a configuration of forcibly closing the isolation valve by stopping the supply of power to the coil when an open limit time for the isolation valve is exceeded, internal pressure of the fuel tank may be increased due to sudden closing of the isolation valve during the supply of fuel. Consequently, damage, such as overflowing in which fuel flows over the fuel tank may occur.

Fourth, the plunger, the valve body, and the like for the opening and closing of the isolation valve may not be reliably fixed to opening positions or closing positions, thereby degrading the performance of the valve or reducing the durability of the valve.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to propose a fuel tank isolation valve for a vehicle, which uses a protruding unit structure as a configuration for opening and closing an isolation valve. The protruding unit structure is configured to selectively press a plunger, configured to rotate and move vertically along a guide slot, and a button unit. Thus, an opened position and a closed position of the valve may be maintained even in a situation in which no current is applied. Accordingly, it is possible to prevent the discharge of a battery by preventing the continuous supply of current to the coil. In addition, the opening operation of the isolation valve may be divided into two separate operations, thereby preventing the pressure of the fuel tank from being abruptly changed.

According to one aspect of the present disclosure, a fuel tank isolation valve is provided for a vehicle. The isolation valve may include: an upper housing; a bobbin with a coil wound thereon, the bobbin being mounted inside the upper housing; a core having a plunger lift path with an open bottom portion provided therein, the core being mounted inside the bobbin; a lower housing having a first path that communicates with a fuel tank, a second path that communicates with a canister, and an opening/closing path formed between the first path and the second path, the lower housing being fitted to the upper housing; a plunger disposed in the plunger lift path, and configured to rotate and move vertically along a guide slot provided in an outer circumferential surface of the plunger lift path in response to a current being applied to the coil; a protruding unit that protrudes from a lower portion of the plunger; a button unit disposed below the plunger lift path. The button unit selectively enables a valve opened position by receiving pressure applied thereto by the protruding unit when the plunger moves vertically. The valve further includes a first spring compressively disposed between the plunger and a spring support plate; a valve drive plate disposed on a bottom end of the core to be movable vertically while hermetically isolating the plunger lift path; and a valve body configured such that an orifice tube thereof allows the first path to communicate with the second path, and disposed in the opening/closing path to be movable vertically.

The plunger may include a plurality of guide protrusions that protrude from an outer circumferential surface thereof, the guide protrusions being configured to be inserted into the guide slot. The guide slot may include: standby sections in which the guide protrusions are caught; first oblique sections obliquely extending downward from the standby sections such that the plunger is rotatable and movable; vertical sections branched from the first oblique sections and configured to guide a vertical movement of the plunger; and second oblique sections extending above the vertical sections and obliquely upward toward the adjacent standby sections to guide a movement of the plunger toward the adjacent standby sections when the plunger returns after having opened or closed of the valve.

Each of the standby sections may have a 90° interval from an adjacent one of the standby sections along the outer circumferential surface of the plunger lift path. The protruding unit may include: valve opening protrusions configured to press both side portions of the button unit to maintain the valve opened position; and valve closing protrusions configured to press an upper portion of the button unit in response to the plunger rotating and moving, thereby moving the valve opened position to a valve closed position.

The length of the valve opening protrusions may be longer than that of the valve closing protrusions. The button unit may include: a body coupled to be movable vertically in the spring support plate; first button portions disposed on both side portions of the body, and configured to be selectively disengaged from catch recesses provided in the spring support plate when pressed by the valve opening protrusions; and a second button portion disposed on an upper portion of the body, and configured to move downward and be selectively caught by the catch recesses when pressed by the valve closing protrusions.

The second button portion may include an insertion recess configured to selectively prevent interference by the valve closing protrusions that move downward when the first button portions are pressed by the valve opening protrusions, and is selectively configured to move down when in contact with the valve closing protrusions. The valve closing protrusions may be inserted into the insertion recess to maintain the valve opened position in response to the valve opening protrusions pressing the first button portions as the plunger rotates and moves at 90° along the guide slot, and selectively press and downwardly move the second button portion, thereby moving to the valve closed position.

The plunger may include a stopper configured to be in contact with a top end surface of the plunger lift path while being buffered when returned to an original position by the first spring. The fuel tank isolation valve may further include: a second spring compressively disposed between the valve drive plate and the valve body; and a third spring disposed between a bottom surface of the valve body and a bottom surface of the opening/closing path. The valve drive plate may be mounted on a lower end of the core by a diaphragm to maintain a hermetic state.

In the fuel tank isolation valve for the vehicle according to the present disclosure, the structure of the protruding unit is provided as a configuration for opening and closing the isolation valve. The protruding unit is configured to selectively press the plunger, configured to rotate and move vertically along the guide slot, and the button unit. Thus, the opened position and the closed position of the valve may be maintained even in a situation in which no current is applied. Accordingly, it is possible to prevent the discharge of a battery by preventing the continuous supply of current to the coil.

In addition, the opening operation of the isolation valve may be divided into two separate operations, i.e., the operation of first opening the orifice tube of the valve body and the operation of actually opening the valve body, thereby preventing the pressure of the fuel tank from being abruptly changed. Furthermore, according to the present disclosure, an abrupt change in the pressure of the fuel tank is prevented. Thus, it is possible to prevent the vent valve of the fuel tank from being clogged or fuel cavitation, due to an increase in the discharge flow rate caused by a sudden change in pressure in an overpressure state of the fuel tank. It is also possible to prevent problems occurring in a fuel pump, such as a decrease in the flow rate or turning off of the fuel pump, due to fuel cavitation.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
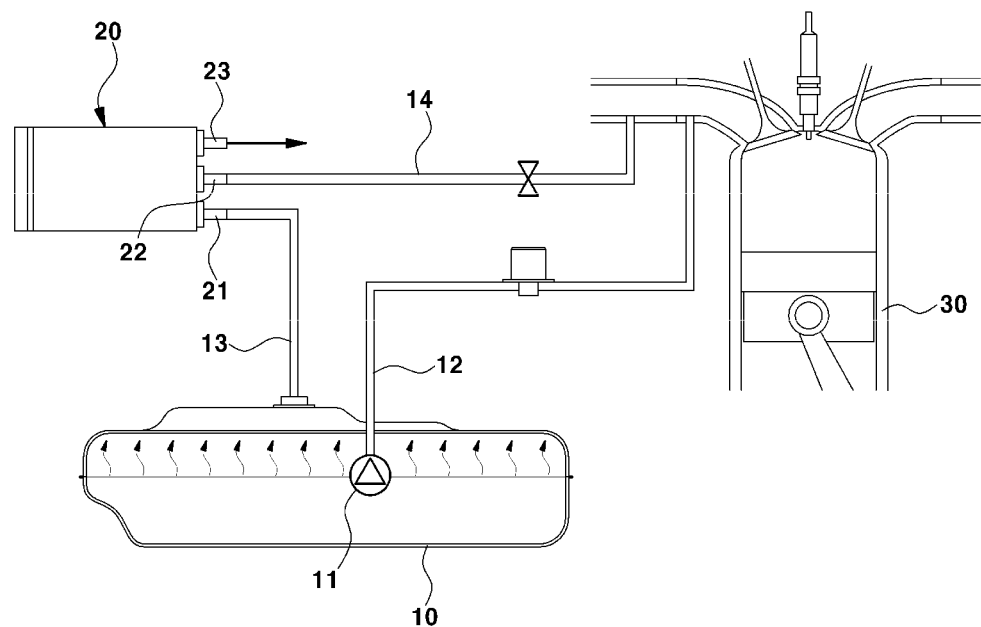
FIG. 1 is a schematic view illustrating a situation in which evaporation gas within a fuel tank is collected in a canister and then is purged to an engine according to the prior art.
Figure 2:
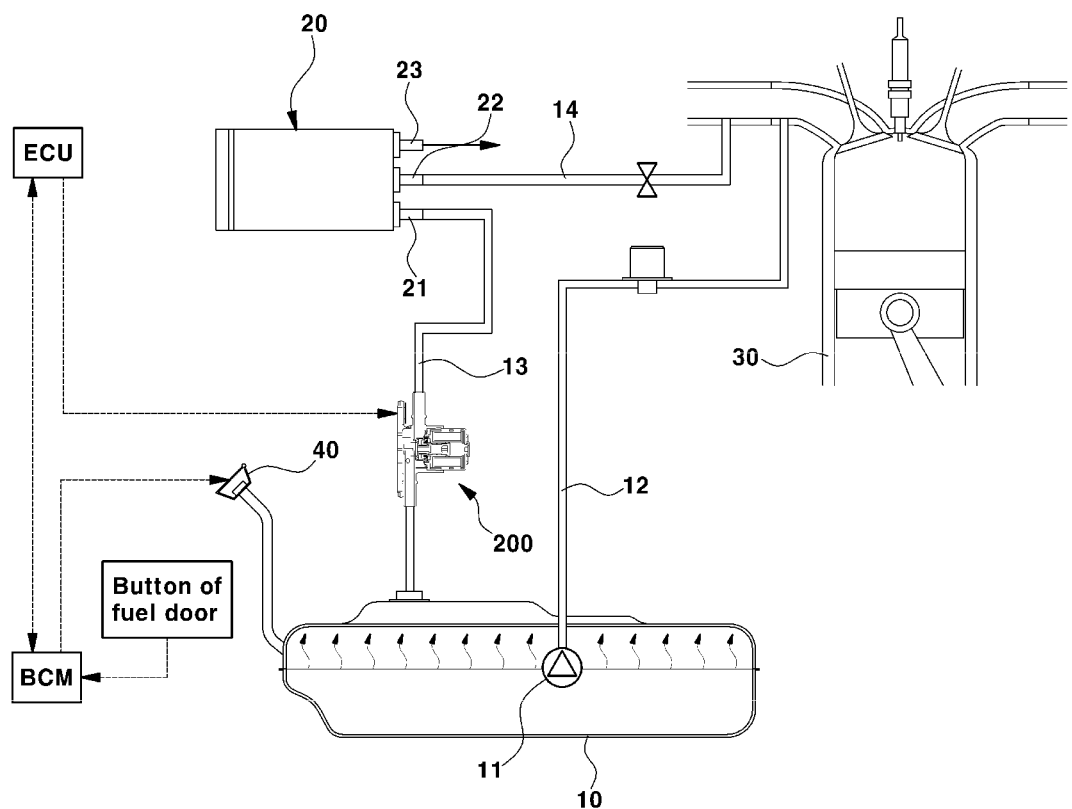
FIG. 2 is a schematic view illustrating a situation in which an isolation valve is disposed between the fuel tank and the canister according to the prior art.
Figure 3:
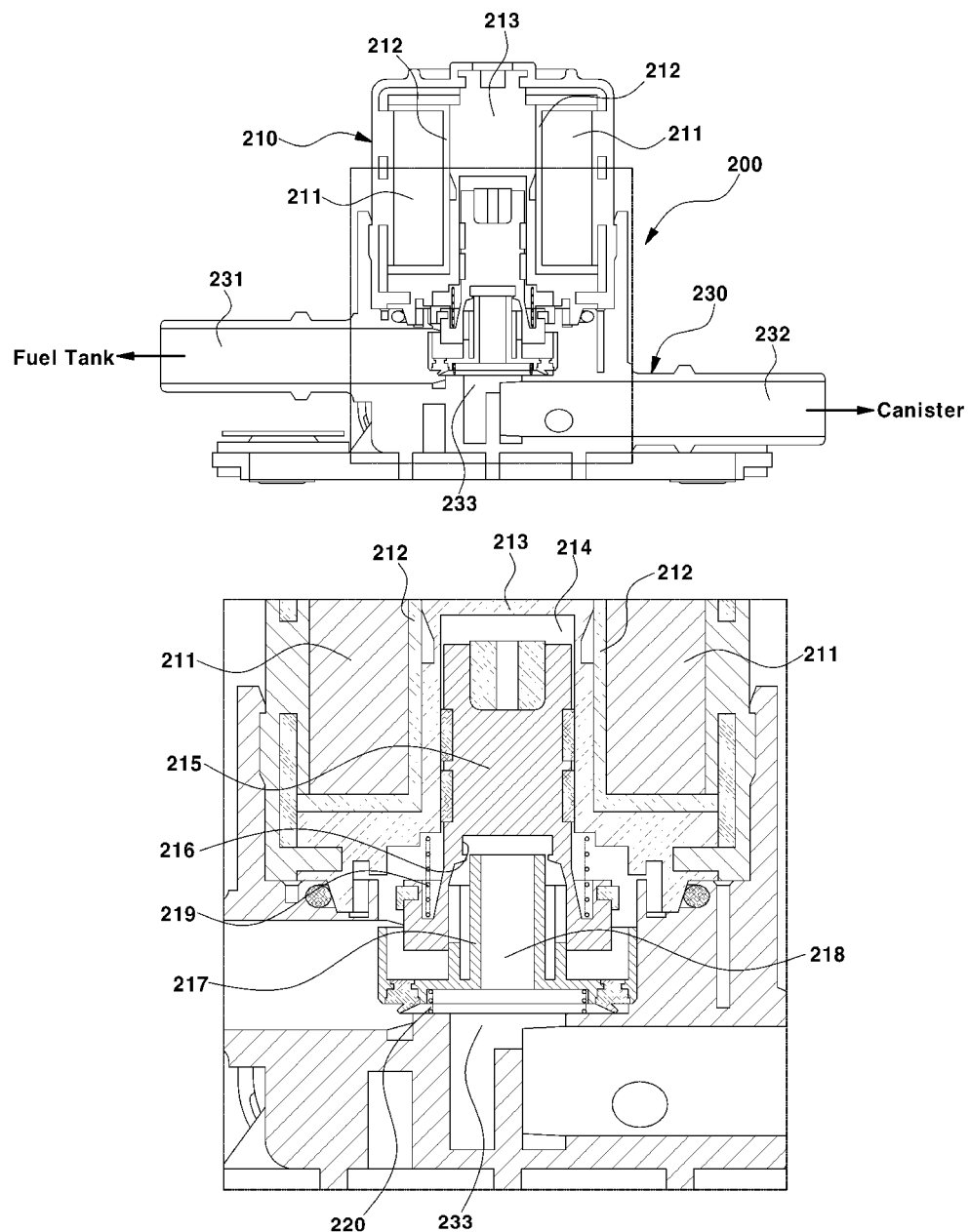
FIG. 3 is a cross-sectional view illustrating a configuration of an isolation valve of the related art and a closing operation of the isolation valve according to the prior art.
Figure 4:
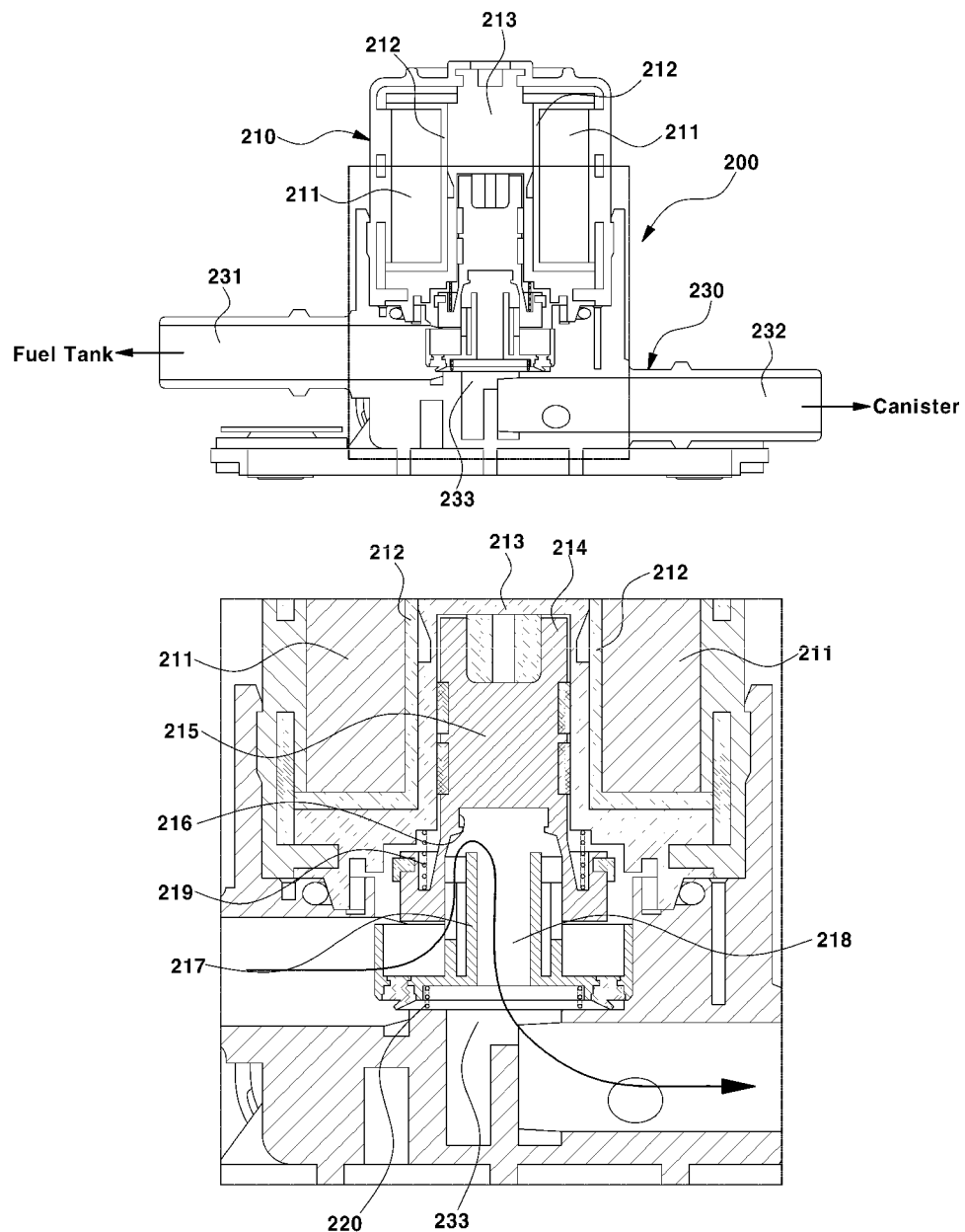
FIGS. 4 and 5 are cross-sectional views illustrating the configuration of the isolation valve of the related art and an opening operation of the isolation valve according to the prior art.
Figure 5:
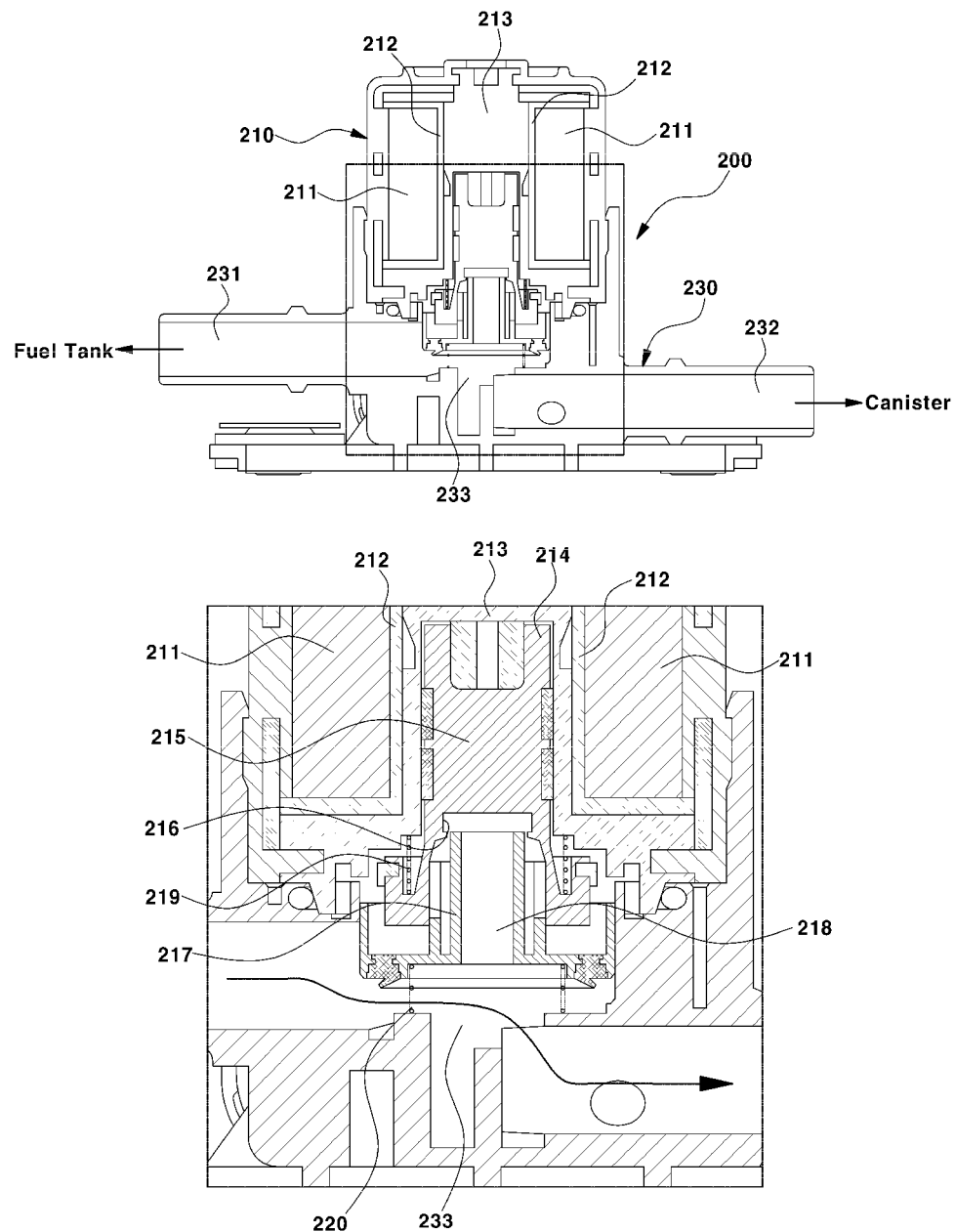

Hereinafter, exemplary embodiments of the present disclosure will be described in detail with reference to the accompanying drawings.

Advantages and features of the present disclosure, as well as methods of realizing the same, will be more clearly understood from the following detailed description of embodiments when taken in conjunction with the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

However, the present disclosure is not limited to specific embodiments to be described hereinafter but may be embodied in a variety of different forms. Rather, these embodiments are provided so that the description of the present disclosure will be complete and will fully convey the scope of the present disclosure to those skilled in the technical field to which the present disclosure pertains. The present disclosure shall be defined by the scope of the claims.

Figure 6:
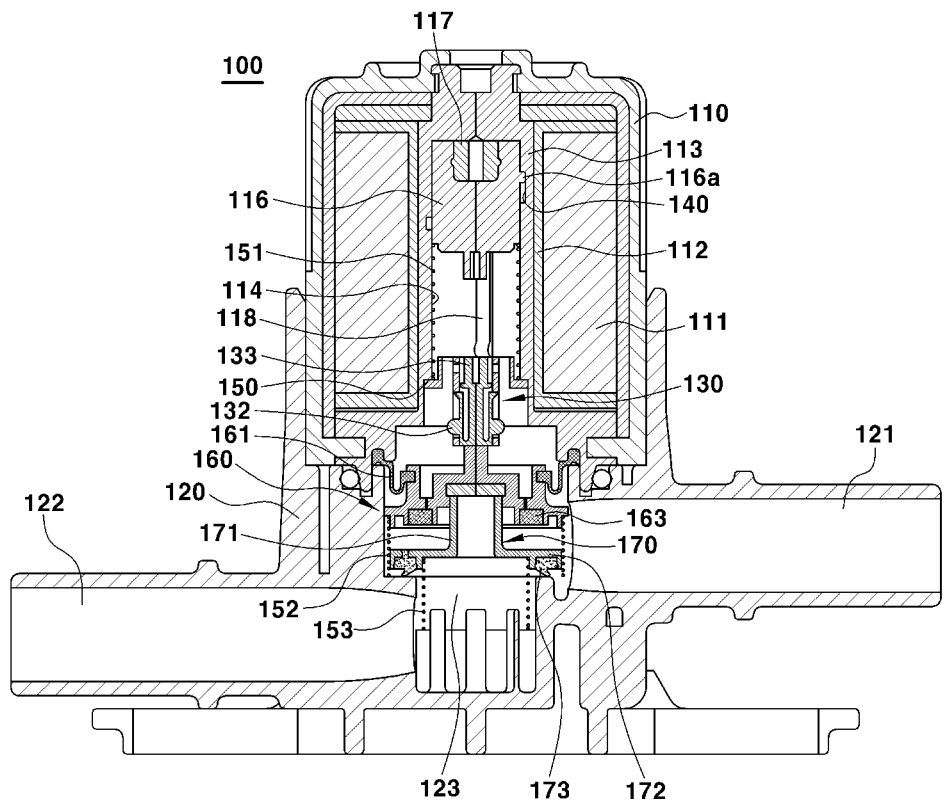
FIG. 6 is a cross-sectional view illustrating a fuel tank isolation valve for a vehicle according to the present disclosure.

Further, in the following description of the present disclosure, a detailed description of known technology or the like will be omitted in the situation in which the subject matter of the present disclosure may be rendered rather unclear thereby. As illustrated in FIG. 6, referring to the exterior of an isolation valve 100 according to the present disclosure, the isolation valve 100 includes an upper housing 110 and a lower housing 120 coupled to the upper housing 110.

A first path 121 that communicates with a fuel tank and a second path 122 that communicates with a canister are disposed inside the lower housing 120. An opening/closing path 123 configured to be opened and closed by a valve body 170 is disposed at the boundary between the first path 121 and the second path 122. A hollow bobbin 112 with a coil 111 wound thereon may be mounted on the inner wall of the upper housing 110, and a core 113 may be disposed inside the bobbin 112.

A plunger lift path 114 with the bottom portion thereof being open may be disposed within the core 113. A plunger 116 may be accommodated in the plunger lift path 114 of the core 113 and may be configured to move vertically in response to a current being applied to the coil. Particularly, a stopper 117 may be mounted on the top surface of the plunger 116. The stopper 117 may be in contact with the top end surface of the plunger lift path 114 while being buffered, thereby limiting a distance to which the plunger 116 is allowed to move vertically and buffering the plunger 116.

Figure 7:
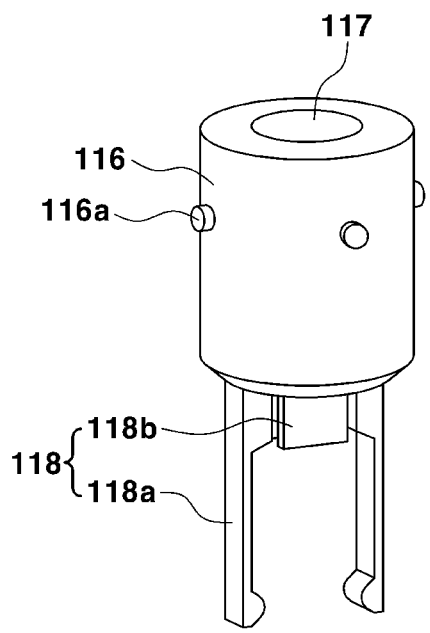
FIG. 7 is a perspective view illustrating structures of the plunger and the protruding unit of the fuel tank isolation valve for a vehicle according to the present disclosure.

In addition, as illustrated in FIG. 7, a protruding unit 118 protrudes from the lower portion of the plunger 116. When the plunger 116 moves downward in response to a current being applied thereto, a button unit 130 is selectively pressed, thereby causing the valve to be opened or closed. In addition, the plunger 116 may rotate or move vertically along a guide slot 140 forming a path on the outer circumferential surface of the plunger lift path 114. Such rotation and upward and downward (e.g., vertical) movement of the plunger 116 may be performed as a plurality of guide protrusions 116a move along the path while being received in the guide slot 140.

Figure 8:
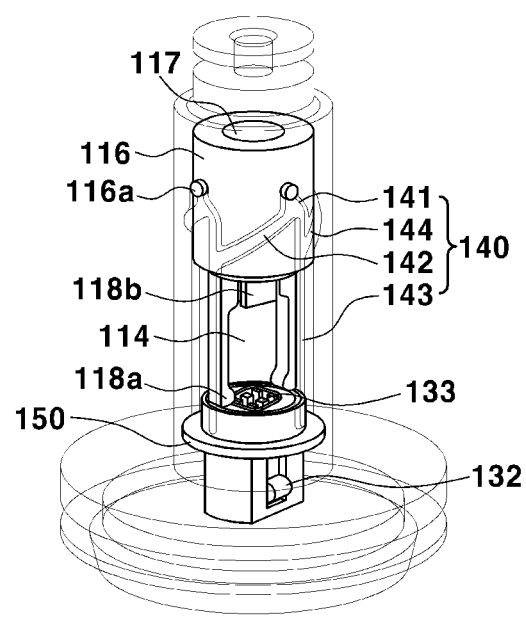
FIG. 8 is a perspective view illustrating an arrangement structure of the fuel tank isolation valve for a vehicle according to the present disclosure, in which the plunger and the button unit are fitted.
Figure 9:
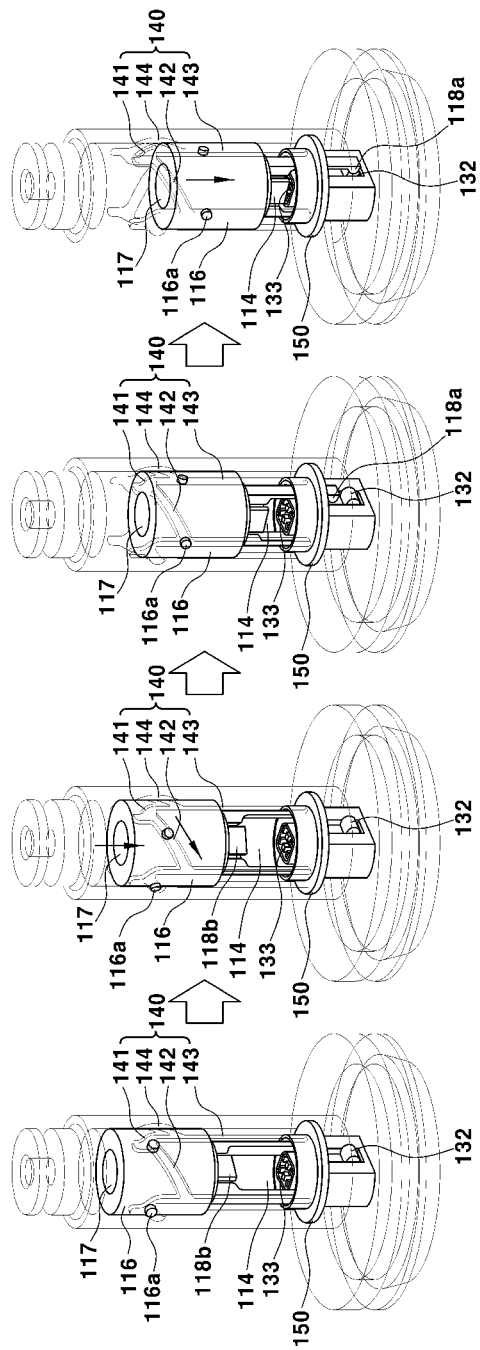
FIG. 9 is a perspective view sequentially illustrating operations of the plunger of the fuel tank isolation valve for a vehicle according to the present disclosure when current is applied thereto.
Figure 10:
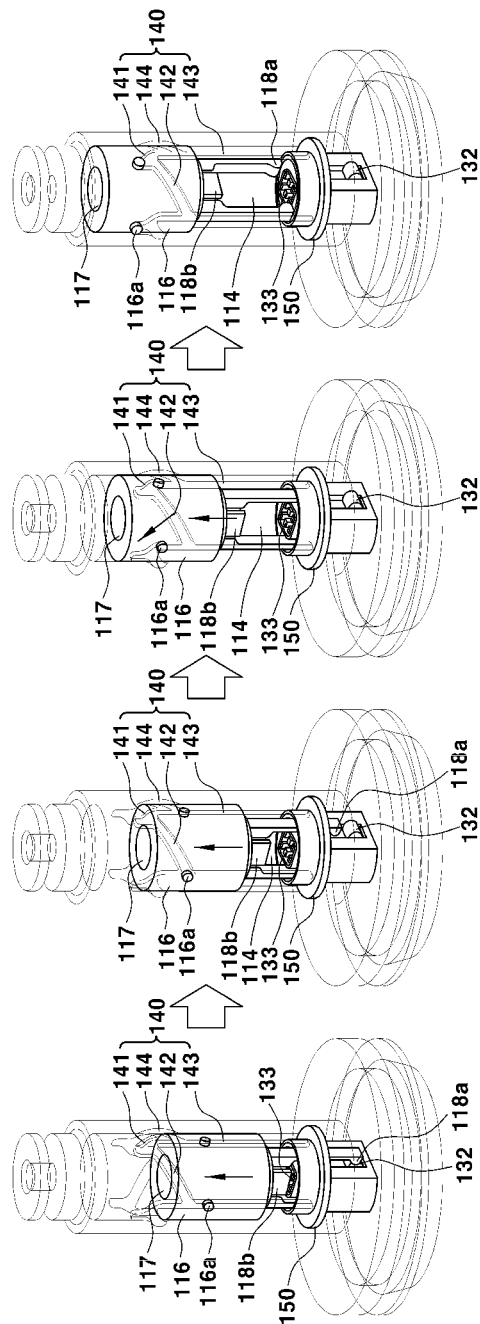
FIG. 10 is a perspective view sequentially illustrating operations of the plunger of the fuel tank isolation valve for a vehicle according to the present disclosure when the application of current is canceled.

As illustrated in FIGS. 8 to 10, the guide slot 140 may include standby sections 141, first oblique sections 142, vertical sections 143, and second oblique sections 144. The standby sections 141 are sections corresponding to a stopped position of the guide protrusions 116a. The standby sections 141 may be an initial position at which the plunger 116 stands by.

As illustrated in FIG. 9, the first oblique sections 142 obliquely extend downward from the standby sections 141 to allow the plunger 116 to rotate and move along the first oblique sections 142. Since the guide protrusions 116a moving downward in the standby sections 141 first come into contact with the first oblique sections 142, the first oblique sections 142 guide the guide protrusions 116a to move along the slopes thereof.

The vertical sections 143 are branched from the first oblique sections 142, and guide the vertical movement of the plunger 116 to open or close the valve in the top-bottom direction or to return to the original position after having opened or closed the valve in the top-bottom direction. The second oblique sections 144 extend above the vertical sections 143 and obliquely upward toward the adjacent standby sections 141 to guide the movement of the plunger 116 toward the adjacent standby sections 141 when the plunger 116 returns after having opened or closed of the valve.

In particular, portions each between the adjacent standby sections 141 are arranged at right angles from each other along the outer circumferential surface of the plunger lift path 114, i.e., at about 90°. Thus, the plunger 116 moves while rotating in one direction at intervals of about 90°. When current is applied, whenever the plunger 116 moves vertically, the valve may be moved from a valve opened position to a valve closed position or from the valve closed position to the valve opened position. In other words, when current is applied to the coil 111 for the movement to the valve opened position, the guide protrusions 116a located in the standby sections 141 sequentially move to the first oblique sections 142, as illustrated in FIG. 9. Subsequently, the guide protrusions 116a move through the vertical sections 143, and then, valve opening protrusions 118a of the protruding unit 118 press first button portions 132 of the button unit 130. This causes a body 131 to move vertically within a spring support plate 150, thereby leading to the valve opened position.

As illustrated in FIG. 10, even when the application of current to the coil 111 is canceled, elastic restorative force of a first spring 151 causes the guide protrusions 116a to move along the vertical sections 143 and the second oblique sections 144 to be located in the adjacent standby sections 141. Thus, even when the guide protrusions 116a are located in the standby sections 141 when the application of the current is canceled, the valve opened position may be maintained. In addition, the protruding unit 118 includes the valve opening protrusions 118a and valve closing protrusions 118b. The button unit 130 may include the first button portions 132 and a second button portion 133.

Figure 11A:
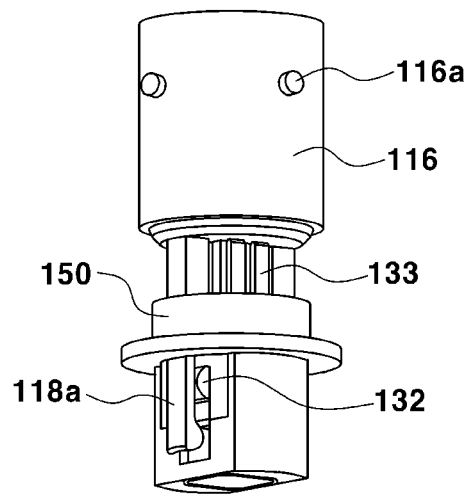
FIG. 11A is a perspective view illustrating an operation of the plunger to operate the fuel tank isolation valve for a vehicle according to the present disclosure in a valve opened position.
Figure 15:
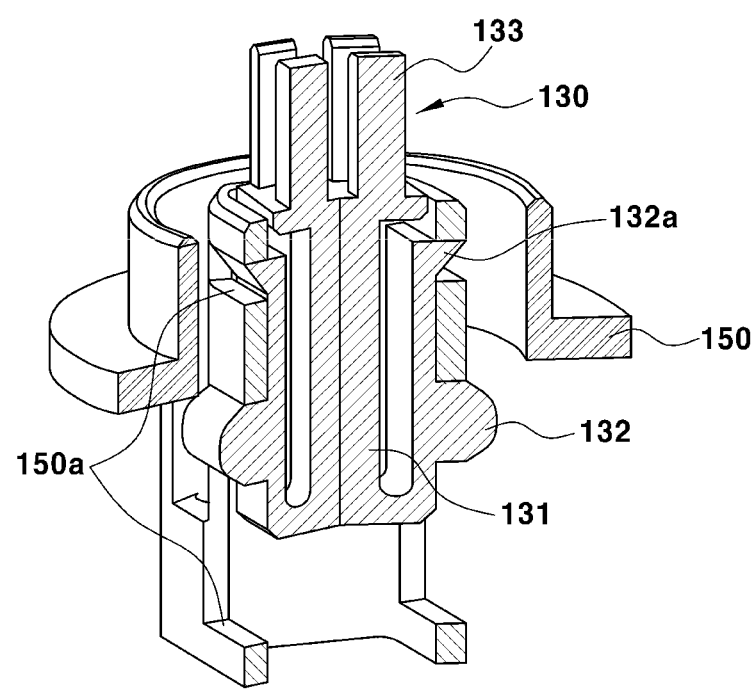
FIG. 15 is a perspective view of the fuel tank isolation valve for a vehicle according to the present disclosure, in which the first button portions are disengaged from the catch recesses.

In this structure, the valve opening protrusions 118a press both side portions of the button unit 130, i.e. the first button portions 132, thereby maintaining the valve opened position. As the first button portions 132 are pressed by the valve opening protrusions 118a, the first button portions 132 are selectively disengaged from catch recesses 150a provided in the spring support plate 150 (see FIGS. 11A and 15). Consequently, the body 131 of the button unit 130 may move vertically within the spring support plate 150, thereby causing the valve to be in the opened position (i.e. first operation).

Figure 12A:
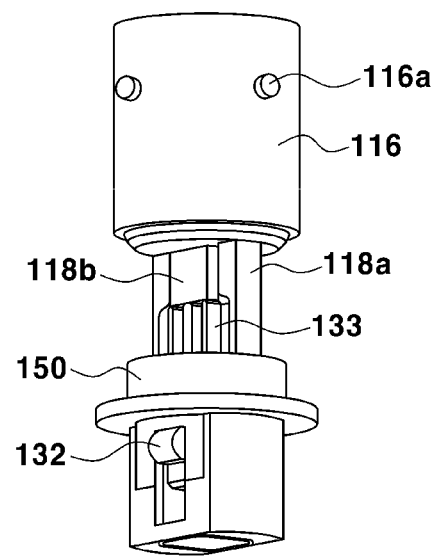
FIG. 12A is a perspective view illustrating an operation of the plunger to operate the fuel tank isolation valve for a vehicle according to the present disclosure in a valve closed position.
Figure 16:
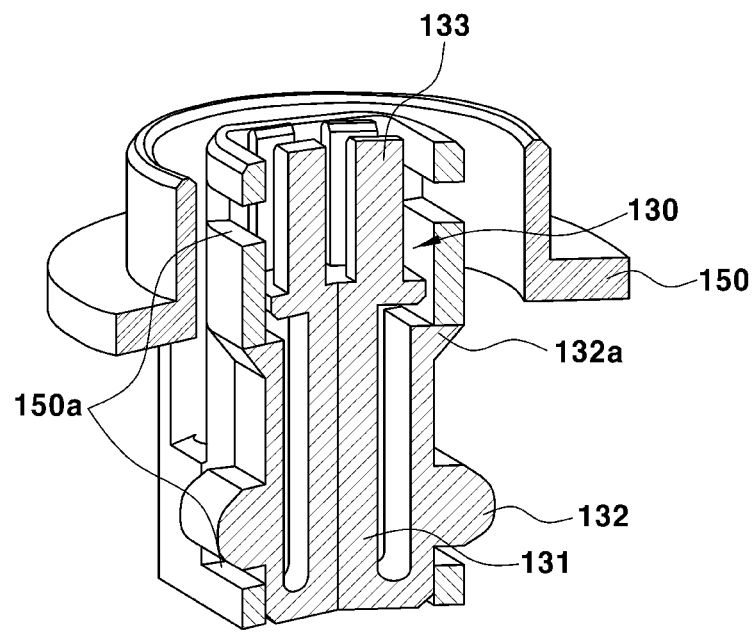
FIG. 16 is a perspective view of the fuel tank isolation valve for a vehicle according to the present disclosure, in which the first button portions are caught by the catch recesses.

In addition, as the plunger 116 rotates and moves, the valve closing protrusions 118b press the upper portion of the button unit 130, i.e., the second button portion 133, as illustrated in FIG. 12A, thereby moving the valve opened position to the valve closed position. At this time, the second button portion 133 is pressed by the valve closing protrusions 118b to move downward, thereby causing the first button portions 132 and a button assistance portion 132a to be selectively caught by the catch recesses 150a provided within the spring support plate 150 (see FIG. 16). Consequently, the body 131 of the button unit 130 may enable the valve closed position within the spring support plate 150 (i.e. second operation).

Figure 11B:
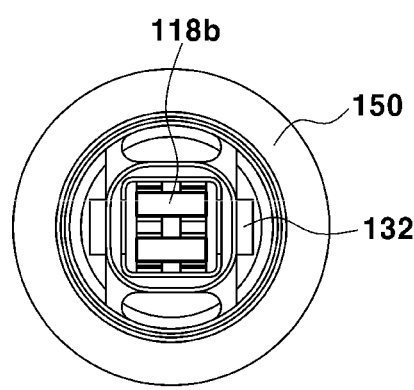
FIG. 11B is a perspective view illustrating an operation of the valve closing protrusions to operate the fuel tank isolation valve for a vehicle according to the present disclosure in a valve opened position.
Figure 12B:
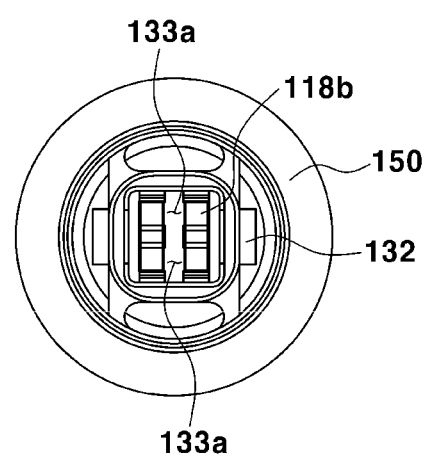
FIG. 12B is a perspective view illustrating an operation of the valve closing protrusions to operate the fuel tank isolation valve for a vehicle according to the present disclosure in a valve closed position.

Particularly, the second button portion 133 has an insertion recess 133a configured to selectively prevent interference by the valve closing protrusions 118b that move downward when the first button portions 132 are pressed by the valve opening protrusions 118a In the first operation, the valve closing protrusions 118b may be inserted into the insertion recess 133a, thereby causing the valve opening protrusions 118a to press the first button portions 132 (see FIG. 11B). In the second operation, the plunger 116 that has rotated and moved at the 90° interval in the first operation may allow the valve closing protrusions 118b to press the top surface of the second button portion 133 (see FIG. 12B).

Hereinafter, the first operation of enabling the valve opened position and the movement from the first operation to the second operation of brining in the valve closed position will be described based on the above-described structure.

First Operation

In a valve closed position as illustrated in FIG. 6, in response to a current being applied to the coil 111, the guide protrusions 116a located in the standby sections 141 move along the first oblique sections 142 and the vertical sections 143. Then, the plunger 116 rotates and moves downward within the plunger lift path 114, so that the valve opening protrusions 118a press the first button portions 132.

Figure 13A:
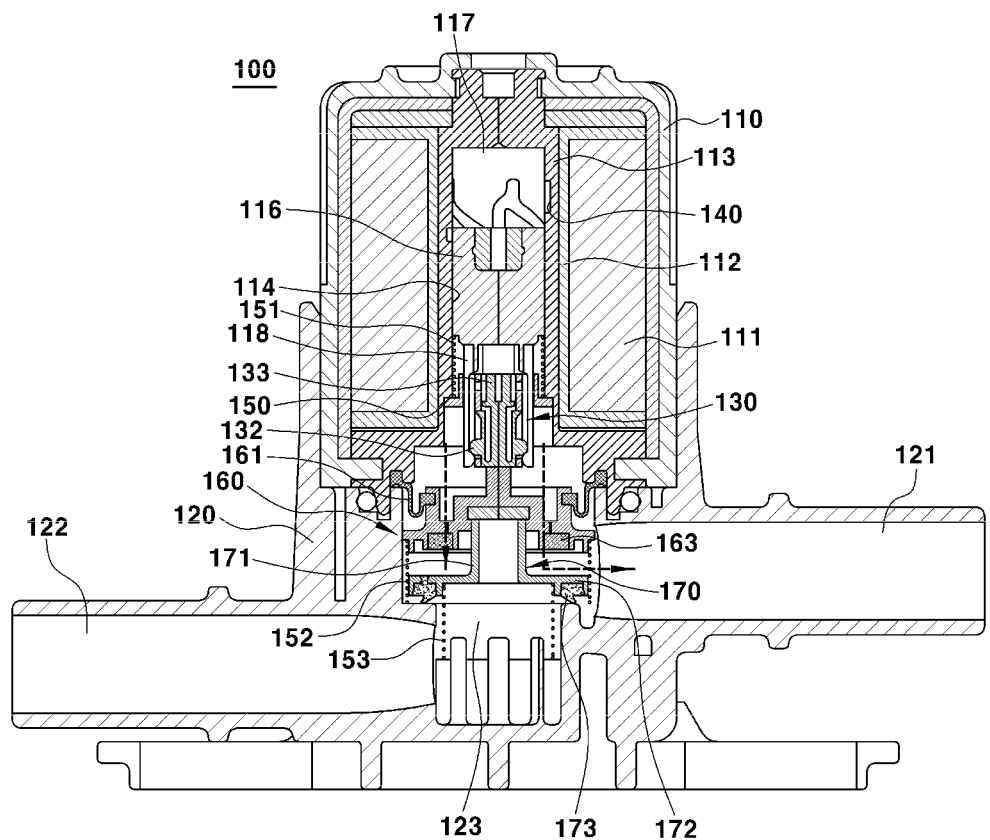
FIGS. 13A to 13C are cross-sectional views sequentially illustrating operations of moving from the valve closed position to the valve opened position in the fuel tank isolation valve for a vehicle according to the present disclosure in a valve closed position.
Figure 13B:
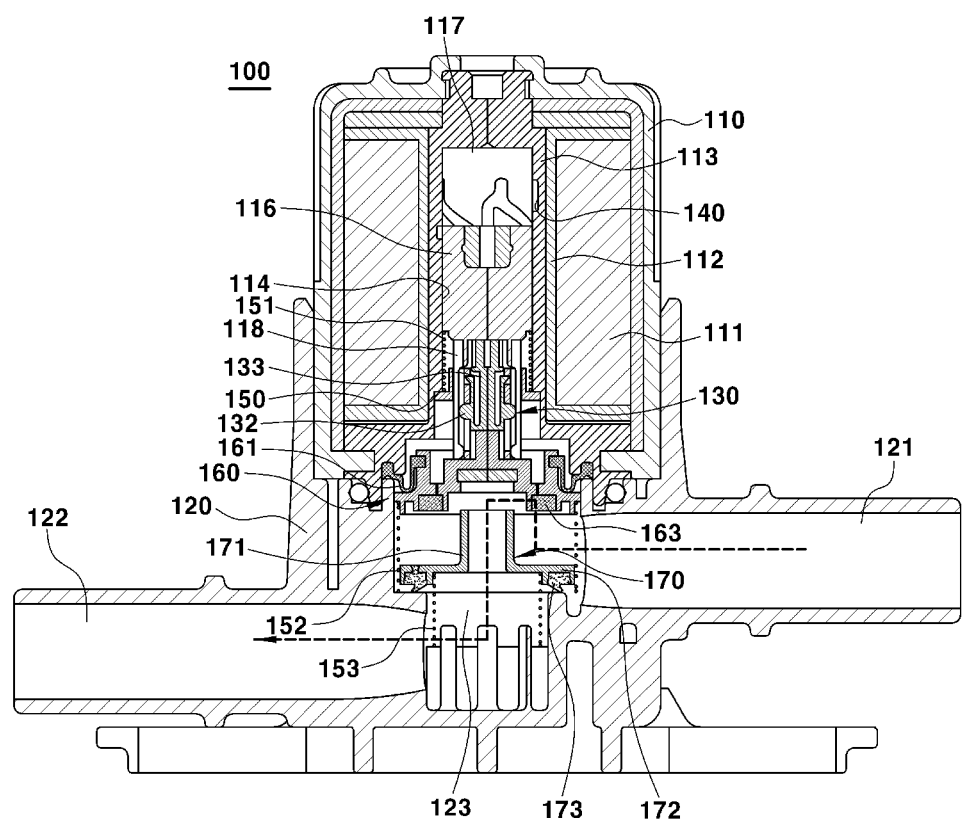

Particularly, air above a diaphragm 161 disposed on the bottom end of the core 113 is discharged through a vent hole 162 and an impurity filter 163 in a valve drive plate 160, as indicated by arrows in FIG. 13. As the valve drive plate 160 is caused move vertically by the second spring 152, the first button portions 132 disengaged from the catch recesses 150a push the lower portion of the body 131 upward, thereby causing an orifice tube 171 of the valve body 170 to be opened.

Figure 18:
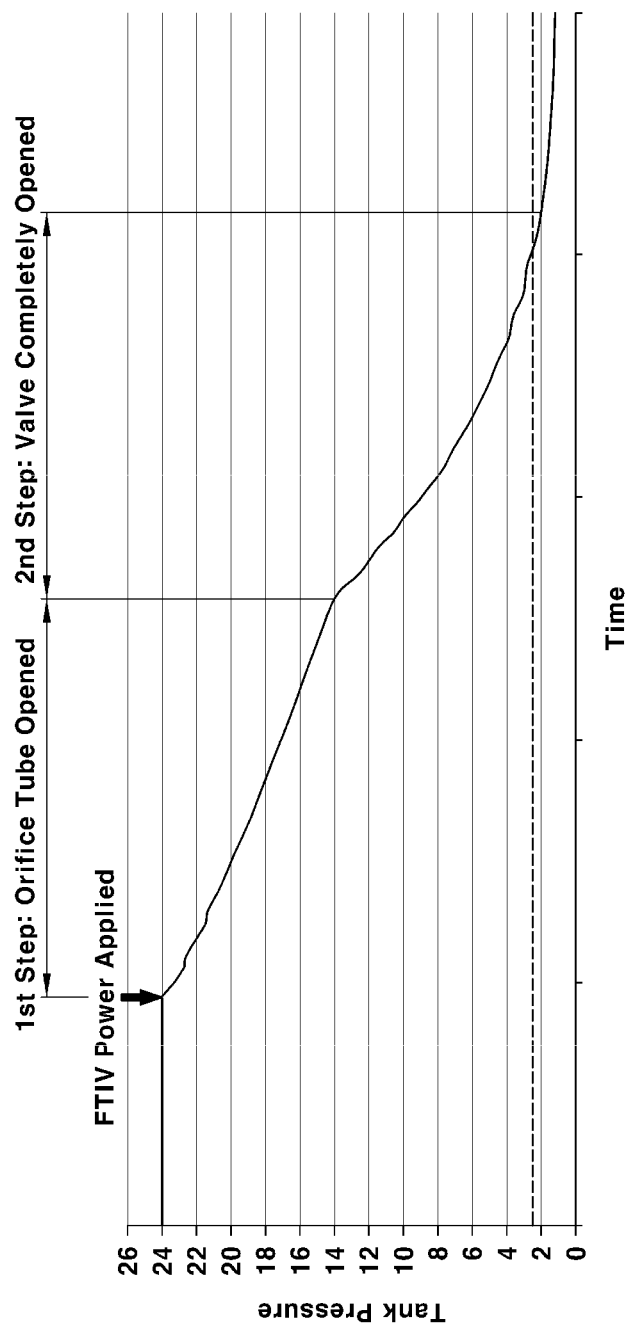
FIG. 18 is a graph illustrating that the fuel tank isolation valve for a vehicle according to the present disclosure operates to be opened by two separate operations, thereby preventing an abrupt change in the pressure of the fuel tank.

Thus, the first path 121 communicating with the fuel tank communicates with the second path 122 communicating with the canister through the opened orifice tube 171. In this situation, primarily, a pressure within the fuel tank may gradually act to the second path 122 through the first path 121 and the orifice tube 171, thereby preventing an abrupt change in pressure within the fuel tank. This may cause an opening operation of the isolation valve to be divided into two separate operations, i.e., an operation of first opening the orifice tube of the valve body and an operation of actually opening the valve body, as illustrated in FIG. 18, thereby preventing the pressure of the fuel tank from being abruptly changed.

Figure 13C:
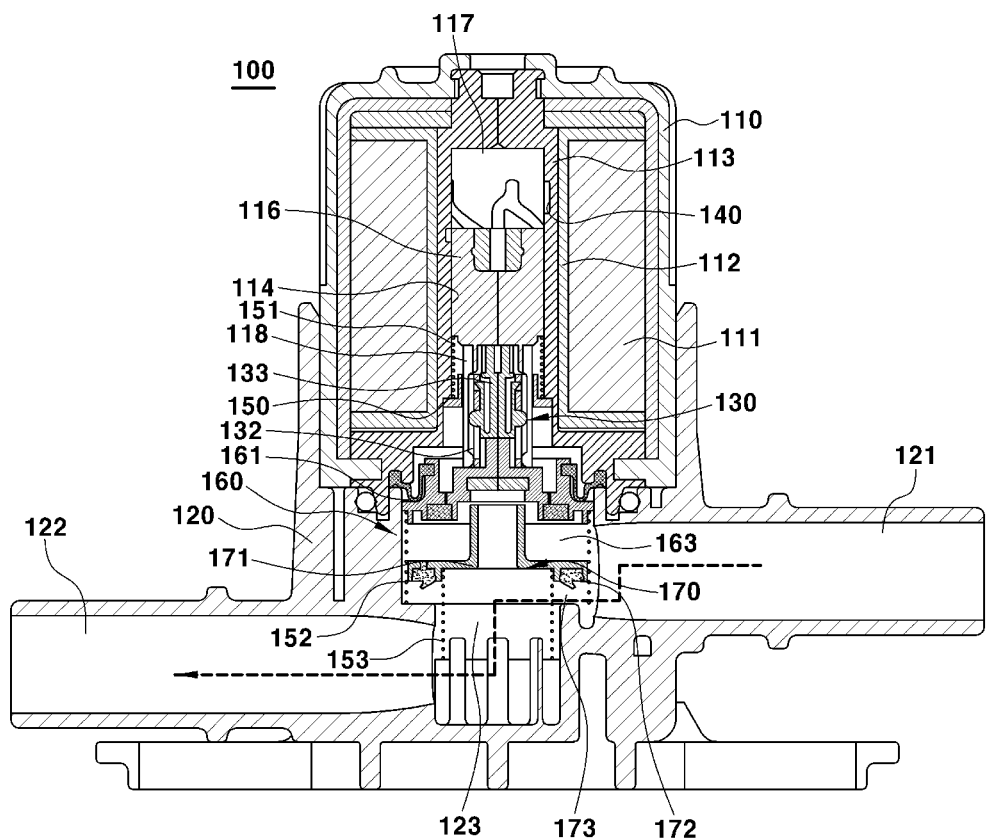

Subsequently, when the pressure within the fuel tank acting to the valve body 170 through the first path 121 from the fuel tank is less than elastic restorative force of a third spring 153 disposed between the bottom surface of the valve body 170 and the bottom surface of the opening/closing path 123, the valve body 170 is caused to move upward by the elastic restorative force of the third spring 153. Then, as illustrated in FIG. 13C, the valve body 170 moves upward, and a valve seat 173 that has been attached to a valve plate 172 is detached from the outer circumferential portion of the opening/closing path 123, thereby causing the opening/closing path 123 to be opened. In this manner, the isolation valve is moved to the opened position.

Thus, evaporation gas within the fuel tank may flow more easily to the canister sequentially through the first path 121, the opening/closing path 123, and the second path 122. When the application of current to the coil 111 is stopped, the guide protrusions 116a move along with the vertical sections 143 and the second oblique sections 144 to be located in the adjacent standby sections 141 to perform a second operation when current is reapplied later. Thus, in the valve opened position, the plunger 116 moves vertically to the original position.

Figure 17:
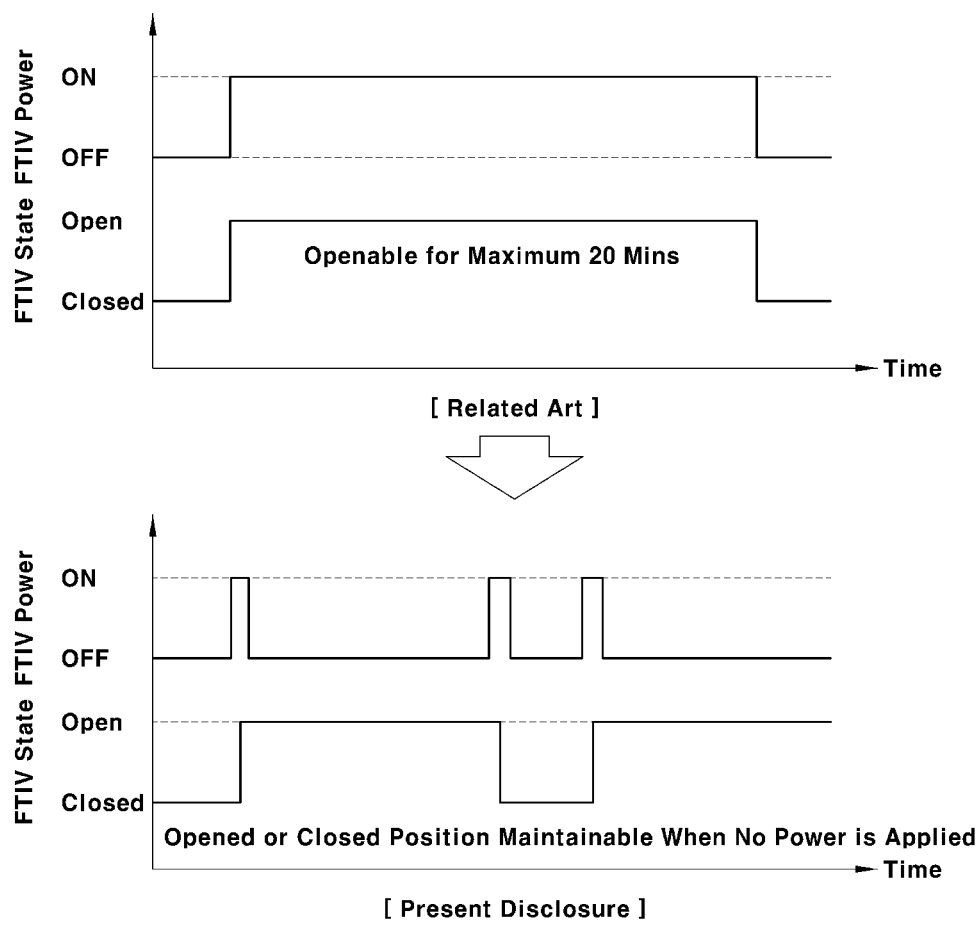
FIG. 17 is a graph illustrating that the fuel tank isolation valve for a vehicle according to the present disclosure may remain in the opened position when no power is applied thereto, in comparison with a related-art technology.

As described above, even in the situation in which the application of current to the coil 111 is stopped, the isolation valve may be maintained in the opened position. Accordingly, as illustrated in FIG. 17, it is possible to prevent the discharge of a battery that would otherwise occur due to continuous supply of current to the coil in the opened position of the isolation valve in the related art.

Second Operation

Figure 14A:
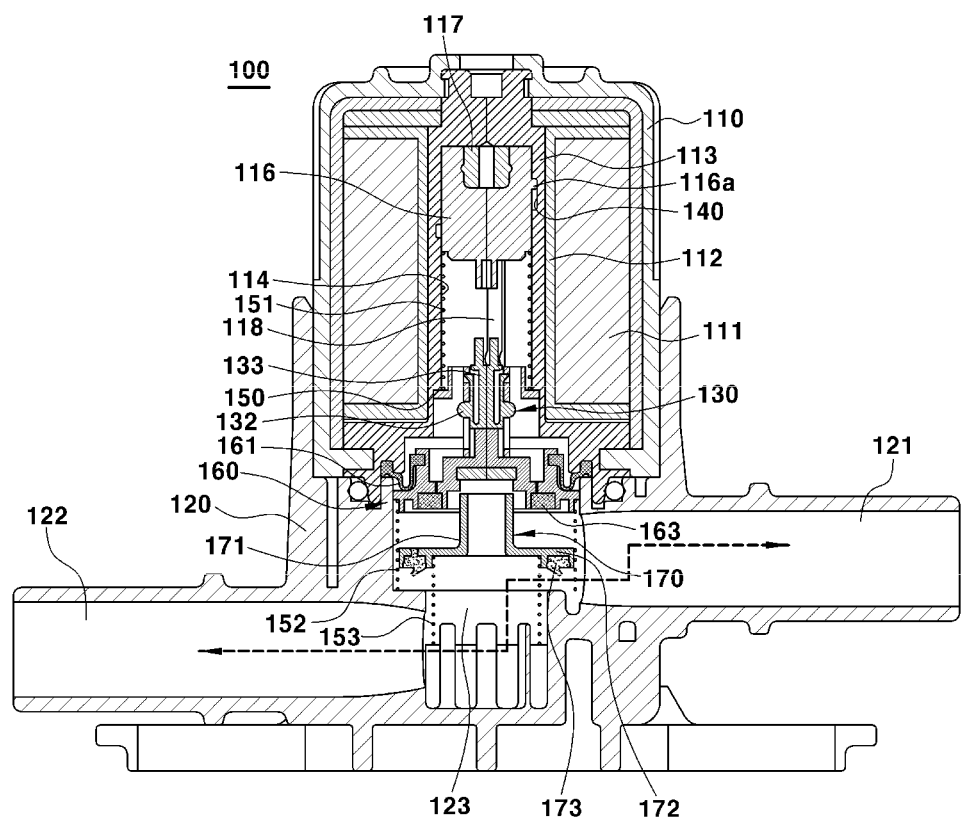
FIGS. 14A to 14C are cross-sectional views sequentially illustrating operations of moving from the valve opened position to the valve closed position in the fuel tank isolation valve for a vehicle according to the present disclosure in a valve closed position.
Figure 14B:
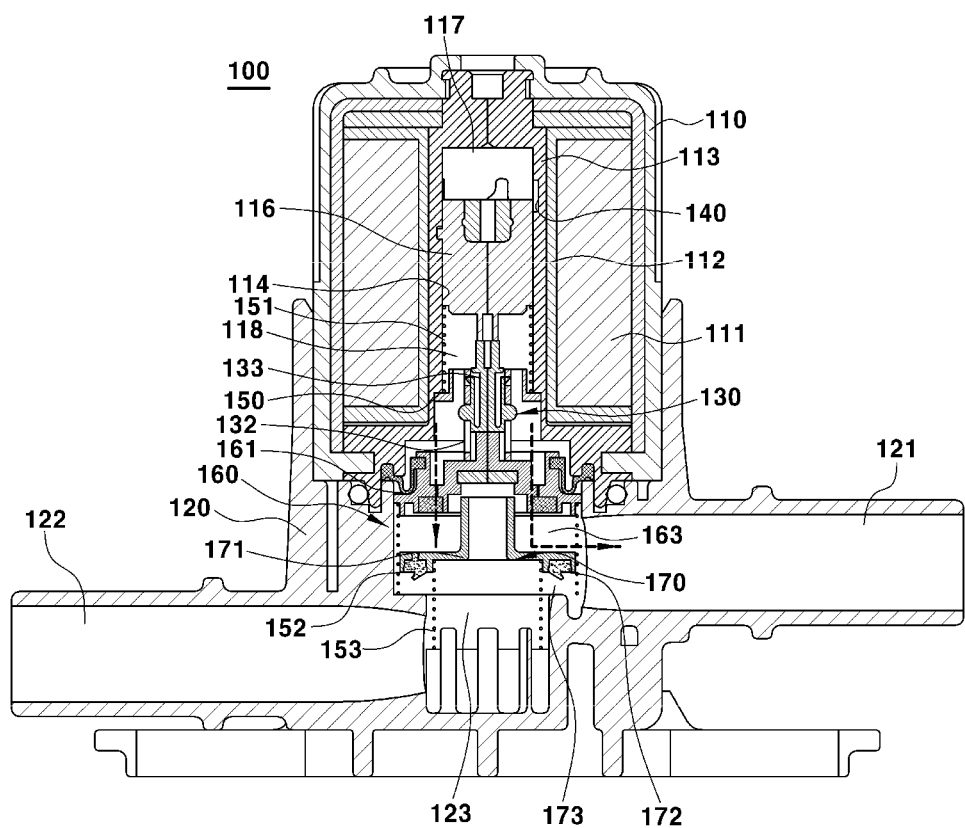

When current is applied to the coil 111 for the movement from the valve opened position as illustrated in FIG. 14 to the valve closed position, the guide protrusions 116a located in the standby sections 141 move along the first oblique sections 142 and the vertical sections 143. Then, the plunger 116 rotates and moves at about 90° intervals within the plunger lift path 114 and moves downward, so that the valve closing protrusions 118b press the second button portion 133, as illustrated in FIG. 14B.

Figure 14C:
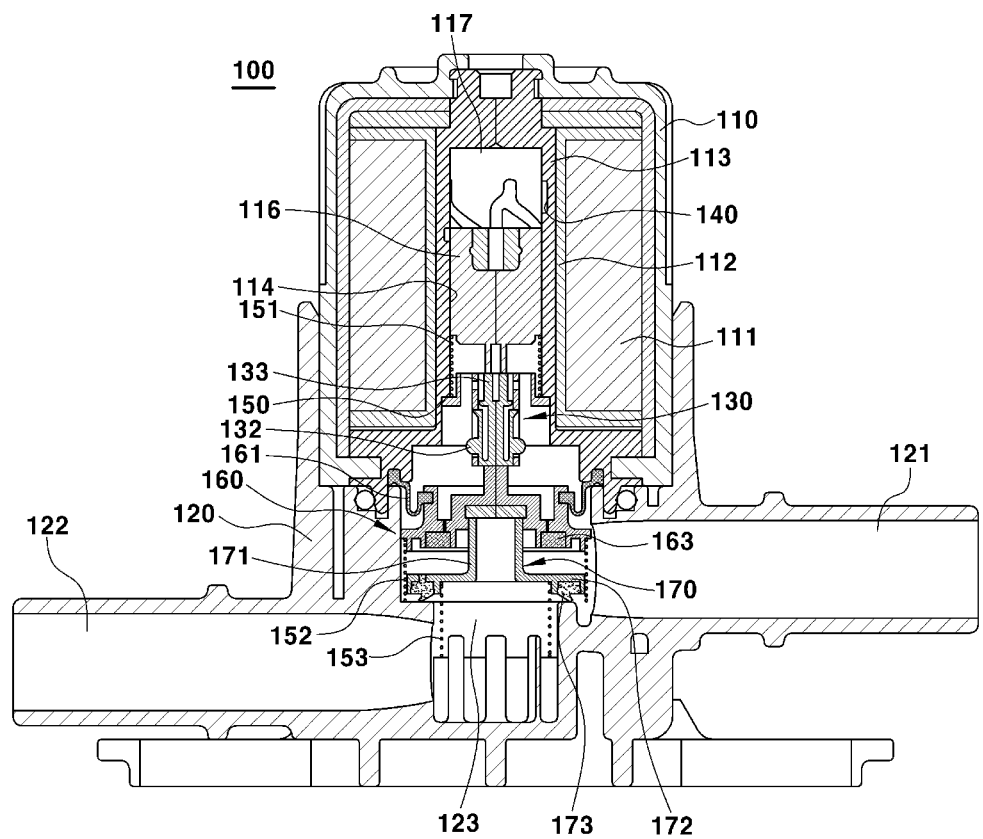

Then, air present in the plunger lift path 114 passes through the vent hole 162 and the impurity filter 163 of the valve drive plate 160 in directions indicated by arrows in FIG. 14B to be discharged to the first path 121 communicating with the fuel tank. In particular, as the second button portion 133 is pressed as illustrated in FIG. 14C, the body 131 moves downward to press the valve drive plate 160, so that the valve drive plate 160 moves downward while compressing the second spring 152. At the same time, the valve drive plate 160 presses the valve body 170, so that the valve body 170 moves downward while compressing the third spring 153.

Then, the valve body 170 moves downward, and the valve seat 173 attached to the valve plate 172 of the valve body 170 is in close contact with the outer circumferential portion of the opening/closing path 123. Consequently, the opening/closing path 123 is closed, thereby preventing evaporation gas within the fuel tank from flowing to the canister. In other words, the isolation valve is in the closed position. Subsequently, when the application of current to the coil 111 is canceled, the guide protrusions 116a move along the vertical sections 143 and the second oblique sections 144 in the same manner as in the first operation to be located in the standby sections 141, and thus, the first operation may be performed when current is reapplied later. Accordingly, in the valve closed position, the plunger 116 moves vertically to the initial position.

As described above, even when no current application in which the application of current to the coil 111 is blocked, the closed position of the isolation valve may be maintained. Accordingly, as illustrated in FIG. 17, it is possible to prevent the discharge of a battery that would otherwise occur due to continuous supply of current to the coil in the opened position of the isolation valve in the related art.

According to the present disclosure, the structure of the protruding unit is provided as a configuration for opening and closing the isolation valve. The protruding unit is configured to selectively press the plunger, configured to rotate and move vertically along the guide slot, and the button unit. Thus, the opened position and the closed position of the valve may be maintained even in a situation in which no current is applied. Accordingly, it is possible to prevent the discharge of a battery by preventing the continuous supply of current to the coil.

In addition, the opening operation of the isolation valve may be divided into two separate operations, i.e., the operation of first opening the orifice tube of the valve body and the operation of actually opening the valve body, thereby preventing the pressure of the fuel tank from being abruptly changed. Furthermore, according to the present disclosure, an abrupt change in the pressure of the fuel tank is prevented. Thus, it is possible to prevent the vent valve of the fuel tank from being clogged or fuel cavitation, due to an increase in the discharge flow rate caused by a sudden change in pressure in an overpressure state of the fuel tank. It is also possible to prevent problems occurring in a fuel pump, such as a decrease in the flow rate or turning off of the fuel pump, due to fuel cavitation.

Although the exemplary embodiments of the present disclosure have been described for illustrative purposes, those skilled in the art will appreciate that various modifications, additions, and substitutions are possible therefrom. It will also be apparent to those skilled in the art that all or some of the above-described embodiments may be selectively combined. Therefore, the true scope of technical protection of the present disclosure shall be defined by the technical concept of the accompanying Claims.

What is claimed is:

1. A fuel tank isolation valve for a vehicle, the fuel tank isolation valve comprising:
   an upper housing;
   a bobbin with a coil is wound thereon, wherein the bobbin is mounted inside the upper housing;
   a core having a plunger lift path with an open bottom portion provided therein, wherein the core being is mounted inside the bobbin;
   a lower housing having a first path that communicates with a fuel tank, a second path that communicates with a canister, and an opening/closing path formed between the first path and the second path, wherein the lower housing is fitted to the upper housing;
   a plunger disposed in the plunger lift path, and configured to rotate and move vertically along a guide slot provided in an outer circumferential surface of the plunger lift path in response to a current being applied to the coil;
   a protruding unit that protrudes from a lower portion of the plunger;
   a button disposed below the plunger lift path, wherein the button selectively enables a valve opened position by receiving pressure applied thereto by the protruding unit when the plunger moves vertically;
   a first spring compressively disposed between the plunger and a spring support plate;
   a valve drive plate connected to a bottom end of the core to be movable vertically; and
   a valve body having an orifice tube, wherein the orifice tube allows the first path to communicate with the second path, and the valve body is disposed in the opening/closing path to be movable vertically.

2. The fuel tank isolation valve according to claim 1, wherein the plunger includes a plurality of guide protrusions protruding from an outer circumferential surface thereof, the guide protrusions being configured to be inserted into the guide slot.

3. The fuel tank isolation valve according to claim 2, wherein the guide slot includes:
   standby sections in which the guide protrusions are caught;

first oblique sections obliquely extending downward from the standby sections such that the plunger is rotatable and movable;
vertical sections branched from the first oblique sections and configured to guide an upward or downward movement of the plunger; and
second oblique sections extending above the vertical sections and obliquely upward toward the adjacent standby sections to guide a movement of the plunger toward the adjacent standby sections.

4. The fuel tank isolation valve according to claim 3, wherein each of the standby sections has an approximate 90° interval from an adjacent one of the standby sections along the outer circumferential surface of the plunger lift path.

5. The fuel tank isolation valve according to claim 1, wherein the protruding unit includes:
  valve opening protrusions configured to press the button to maintain the valve opened position; and
  valve closing protrusions configured to press an upper portion of the button in response to the plunger rotating and moving, thereby moving the valve opened position to a valve closed position.

6. The fuel tank isolation valve according to claim 5, wherein the length of the valve opening protrusions is longer than that of the valve closing protrusions.

7. The fuel tank isolation valve according to claim 5, wherein the button includes:
  a body coupled to be movable vertically in the spring support plate;
  first button portions disposed on the body, and configured to be selectively disengaged from catch recesses provided in the spring support plate when pressed by the valve opening protrusions; and
  a second button portion disposed on an upper portion of the body, and configured to move downward and be selectively caught by the catch recesses when pressed by the valve closing protrusions.

8. The fuel tank isolation valve according to claim 7, wherein the second button portion includes an insertion recess configured to selectively prevent interference by the valve closing protrusions that move downward when the first button portions are pressed by the valve opening protrusions, and is selectively configured to move down when in contact with the valve closing protrusions.

9. The fuel tank isolation valve according to claim 8, wherein the valve closing protrusions are inserted into the insertion recess to maintain the valve opened position in response to the valve opening protrusions pressing the first button portions as the plunger rotates and moves at about 90° along the guide slot, and selectively press and downwardly move the second button portion, thereby moving to the valve closed position.

10. The fuel tank isolation valve according to claim 1, wherein the plunger includes a stopper configured to be in contact with a top end surface of the plunger lift path while being buffered when returned to an original position by the first spring.

11. The fuel tank isolation valve according to claim 1, further comprising:
  a second spring compressively disposed between the valve drive plate and the valve body; and
  a third spring disposed between a bottom surface of the valve body and a bottom surface of the opening/closing path.

12. The fuel tank isolation valve according to claim 1, wherein the valve drive plate is mounted on a lower end of the core by a diaphragm to maintain a hermetic state.

\* \* \* \* \*